United States Patent [19]

Haubennestel et al.

[11] Patent Number: 4,795,796
[45] Date of Patent: Jan. 3, 1989

[54] ADDITION COMPOUNDS SUITABLE FOR USE AS DISPERSING AGENTS AND DISPERSION STABILIZERS, PROCESS FOR THEIR PRODUCTION, THEIR USE AND SOLIDS COATED THEREWITH

[75] Inventors: Karlheinz Haubennestel; Wolfgang Pritschins, both of Wesel, Fed. Rep. of Germany

[73] Assignee: BYK-Chemie GmbH, Wesel, Fed. Rep. of Germany

[21] Appl. No.: 129,104

[22] Filed: Dec. 4, 1987

[30] Foreign Application Priority Data

Dec. 5, 1986 [DE] Fed. Rep. of Germany ....... 3641581

[51] Int. Cl.$^4$ ............................................. C08G 18/10
[52] U.S. Cl. ......................................... 528/28; 528/49
[58] Field of Search ...................................... 528/28, 49

[56] References Cited

U.S. PATENT DOCUMENTS 4,619,955 10/1986 Druetzler .............................. 528/49

Primary Examiner—Maurice J. Welsh
Attorney, Agent, or Firm—Foley & Lardner, Schwartz, Jeffery, Schwaab, Mack, Blumenthal & Evans

[57] ABSTRACT

Addition compounds suitable for use as dispersing agents and dispersion stabilizers obtainable by reacting polyisocyanates having an average functionality from 2.5 to 10 with monohydroxy compounds, reacting the resulting reaction products with compounds of Formula II $$G-(E)_n \qquad \text{II}$$

wherein E represents —OH, —NH$_2$ and/or —NHR (wherein R represents an alkyl group having 1 to 4 carbon atoms), n represents 2 or 3, and G represents an aliphatic, cycloaliphatic and/or aromatic group, and further reacting the resulting reaction product with compounds of Formula III $$Z-Q \qquad \text{III}$$

or IV $$Z-NH-Z \qquad \text{IV}$$

wherein Q represents —OH, —NH$_2$, —NHR (wherein R represents an alkyl group having 1 to 4 carbon atoms) or —SH, and Z represents a group which contains at least one acidic functional group, OH-group or Si-(OR)$_m$(R')$_{3-m}$ group (wherein R and R' represent alkyl groups having 1 to 10 carbon atoms and m=1–3). Optionally, OH-groups present in the reaction product may be further reacted with polycarboxylic acids or their anhydrides. The invention also relates to a process for producing these addition compounds, to their use, and to powdered or fibrous solids which are to be worked into liquid systems which are coated with these dispersing agents.

43 Claims, No Drawings

ADDITION COMPOUNDS SUITABLE FOR USE AS DISPERSING AGENTS AND DISPERSION STABILIZERS, PROCESS FOR THEIR PRODUCTION, THEIR USE AND SOLIDS COATED THEREWITH

BACKGROUND OF THE INVENTION

The present invention relates to addition compounds of their salts suitable for use as dispersing agents and as dispersion stabilizers, obtainable by reaction of polyisocyanates, hydroxy compounds and compounds containing Zerewitinoff hydrogen as well as at least one acidic functional group, hydroxy group or alkoxysilyl group, optionally in the presence of solvents and optionally in the presence of reaction catalysts.

The invention further relates to a process for producing these addition compounds, to their use as dispersing agents and dispersion stabilizers, and to powdered or fibrous solids which are to be worked into liquid systems and which are coated with such dispersing agents.

In order to introduce solids into liquid media, high mechanical forces are required. To reduce these dispersion forces, it is conventional to utilize dispersing agents which make it easier to work the solids into the liquid. In general, these are surface active materials, also called tensides, having anionic, cationic as well as non-ionic structures. These materials are used in small amounts, either applied directly to the solids or added to the dispersing medium. By using such a tenside, the dispersion energy is substantially reduced.

It is further known that these solids tend to reagglomerate after the dispersion process due to mutual attraction forces, which nullify the previously expended dispersion energy and lead to serious problems.

An inadequate dispersion becomes apparent through a viscosity increase in liquid systems, total loss of color distinctions in lacquers and coatings, insufficient color development in pigmented synthetic plastics, and decreases in the mechanical strength of reinforced synthetic plastics.

Dispersing agents have been suggested to solve this problem, for example in U.S. Pat. No. 3,788,996; U.S. Pat. No. 3,817,944; U.S. Pat. No. 4,029,861; U.S. Pat. No. 4,032,698; U.S. Pat. No. 4,048,207; U.S. Pat. No. 4,070,388; DE No. 2,125,064, EP No. 0.018,099; EP No. 0,127,325; FR No. 2,241,597; GB No. 1 339,930; GB No. 1 393,401 and GB No. 1 393,402. However, these dispersing agents lead only to partial solutions of the problem, particularly with regard to flocculation-free mixability of various pigments with each other, such as organic pigments and inorganic pigments. Pigment pastes produced according to the aforedescribed process also tend to undergo exchange effects with the surrounding medium, for example after inclusion in lacquers. It can thereby be concluded that the adsorbtion layers which are built up, do not exhibit sufficient stability against desorption.

According to the latest state of the art described in European Patent Application No. 0,154,678, the aforementioned disadvantages can be substantially overcome by use of the addition compounds proposed therein. With these addition compounds outstanding results can be achieved in part. However, a positive effect cannot be generally achieved with all solids to be dispersed and all binders. In a whole series of cases the results achieved are not sufficient to form an absorbtion layer which is stable for a longer period of time and thus assure a sufficient stability.

In addition, in every instance the addition compounds according to EP No. 0,154,678 contain basic nitrogen atoms. As is well known to persons skilled in the art, such basic groups can be disadvantageous in certain fields of application in which such groups lead to exchange effects with the surrounding medium, such as, for example, a decrease in the storage stability of two-component polyurethane systems due to a reaction accelerating effect or accelerating the polymeric decomposition of polyvinyl chloride under thermal stress.

SUMMARY OF THE INVENTION

It is the object of the present invention to develop dispersing agents and dispersion stabilizers without basic groups which do not exhibit the above disadvantages or exhibit hem to a significantly lesser extent, and which in particular lead to dispersions of solids which after the dispersion process do not tend to reagglomerate, or which tend to do so to a lesser extent, and which consequently exhibit better stability.

These and other objects of the invention are achieved by providing an addition compound or salt thereof suitable for use as a dispersing aid or dispersion stabilizer obtained by reacting a polyisocyanate having an average functionality of from 2.5 to 10

(a) with at least one monohydroxycompound of Formula I wherein Y represents:
  (i) an aliphatic or cycloaliphatic hydrocarbon group with 8 to 30 carbon atoms, the hydrogen atoms of which may be partially replaced by halogens or aryl residues, or
  (ii) an aliphatic, cycloaliphatic or aromatic group containing at least one —O—, —NHCOO— or —COO— group, having an average molecular weight $M_n$ from 200 to 10,000, the hydrogen atoms of which may be partially replaced by halogens, in such an amount that 10 to 70% of the NCO-groups are reacted;

(b) reacting the product of stage (a) with at least one compound of Formula II

 G—(E)$_n$  II wherein
E represents —OH, —NH$_2$, or —NHR (in which R represents an alkyl group having 1 to 4 carbon atoms), n represents 2 or 3, and
G represents an aliphatic, cycloaliphatic or aromatic group containing at least 2 carbon atoms having an average molecular weight $M_n$ of at most 3000, which may contain —O—, —COO—, —CONH—, —NHCOO—, —S—, —Si(CH$_3$)$_2$O— or —SO$_2$— group, in such an amount that a further 1 to 50% of the NCO-groups of the originally provided polyisocyanate are reacted, whereby in stages (a) and (b) all total from 20 to 85% of the NCO-groups of the originally provided polyisocyanate are reacted, and (c) reacting the product of stage (b) with at least one compound of Formula III

 Z—Q  III or IV

The objects of the invention are also achieved according to a further preferred aspect of the invention by providing a process for producing addition compounds and salts thereof suitable for use as dispersing agents and as dispersion stabilizers, comprising reacting at least one polyisocyanate having an average functionality from 2.5 to 10

(a) with at least one monohydroxy compound of Formula I $$Y-OH \qquad \qquad I$$

wherein Y represents (i) an aliphatic or cycloaliphatic hydrocarbon group with 8 to 30 carbon atoms, the hydrogen atoms of which may be partially replaced by halogens or aryl residues, or
(ii) an aliphatic, cycloaliphatic or aromatic group containing at least one —O—, —NHCOO— or —COO— group, having an average molecular weight $M_n$ from 200 to 10,000, the hydrogen atoms of which may be partially replaced by halogens, in such an amount that 10 to 70% of the NCO-groups are reacted;

(b) reacting the product of stage (a) with at least one compound of Formula II $$G-(E)_n \qquad \qquad II$$

wherein

E represents —OH, —NH$_2$, or —NHR (in which R represents an alkyl group having 1 to 4 carbon atoms), n represents 2 or 3, and G represents an aliphatic, cycloaliphatic or aromatic group containing at least 2 carbon atoms having an average molecular weight $M_n$ of at most 3000, which may contain —O—, —COO—, CONH—, —NHCOO—, —S—, —Si(CH$_3$)$_2$O— or —SO$_2$— groups, in such an amount that a further 1 to 50% of the NCO-groups of the originally provided polyisocyanate are reacted, whereby in stages (a) and (b) all total from 20 to 85% of the NCO groups of the originally provided polyisocyanate are reacted, (c) reacting the product of stage (b) with at least one of the compound of Formula III $$Z-Q \qquad \qquad III$$

or IV $$Z-NH-Z \qquad \qquad IV$$

wherein

Q represents —OH, —NH$_2$, —NHR (wherein R represents an alkyl group having 1 to 4 carbons atoms) or —SH, and Z may be the same or different and represents an aliphatic, cycloaliphatic or aromatic residue having at least one acidic functional group, OH-group or —Si(OR)$_m$(R')$_{3-m}$— group (wherein R and R' represent alkyl groups with 1 to 10 carbon atoms and m=1−3), in such an amount that at least 0.8 molecule of the compound Z—Q or Z—NH—Z is provided for each remaining isocyanate group not reached in stages (a) and (b).

The objects of the invention are also achieved according to a further preferred aspect of the invention by providing a process for producing addition compounds and salts thereof suitable for use as dispersing agents and as dispersion stabilizers, comprising reacting at least one polyisocyanate having an average functionality from 2.5 to 10

(a) with at least one monohydroxy compound of Formula I $$Y-OH \qquad \qquad I$$

wherein Y represents (i) an aliphatic or cycloaliphatic hydrocarbon group with 8 to 30 carbon atoms, the hydrogen atoms of which may be partially replaced by halogens or aryl residues, or
(ii) an aliphatic, cycloaliphatic or aromatic group containing at least one —O—, —NHCOO— or —COO— group, having an average molecular weight $M_n$ from 200 to 10,000, the hydrogen atoms of which may be partially replaced by halogens, in such an amount that 10 to 70% of the NCO-groups are reacted;

(b) reacting the product of stage (a) with at least one compound of Formula II $$G-(E)_n \qquad \qquad II$$

wherein

E represents —OH, —NH$_2$, or —NHR (in which R represents an alkyl group having 1 to 4 carbon atoms), n represents 2 or 3, and G represents an aliphatic, cycloaliphatic or aromatic group containing at least 2 carbon atoms having an average molecular weight $M_n$ of at most 3000, which may contain —O—, —COO—, CONH—, —NHCOO—, —S—, —Si(CH$_3$)$_2$O— or —SO$_2$— groups, in such an amount that a further 1 to 50% of the NCO-groups of the originally provided polyisocyanate are reacted, whereby in stages (a) and (b) all total from 20 to 85% of the NCO groups of the originally provided polyisocyanate are reacted, (c) reacting the product of stage (b) with at least one of the compound of Formula III

$$Z-Q \qquad \qquad III$$

or IV $$Z-NH-Z \qquad \qquad IV$$

wherein

Q represents —OH, —NH$_2$, —NHR (wherein R represents an alkyl group having 1 to 4 carbon atoms) or —SH, and Z may be the same or different and represents an aliphatic, cycloaliphatic or aromatic residue having at least one acidic functional group, OH-group or Si(OR)$_m$(R')$_{3-m}$— group (wherein R and R' represent alkyl groups with 1 to 10 carbon atoms and m=1−3), in such an amount that at least 0.8 molecule of the compound Z—Q or Z—NH—Z is provided for each remaining isocyanate group not reacted in stages (a) and (b).

According to further preferred aspects of the invention, the objects are achieved by providing a process for dispersing a particulate solid in a liquid comprising applying an addition compound according to the invention to the solid and thereafter dispersing the solid in the liquid, or by providing a process for stabilizing a dispersion of a particulate solid in a liquid comprising incorporating an addition compound according to the invention in the dispersion.

In yet other preferred aspects of the invention the objects of the invention are achieved by providing a particulate solid, e.g. a pigment particle or a reinforcing fiber, coated with an addition compound according to the invention.

DETAILED DESCRIPTION OF PREFERRED EMBODIMENTS

The invention embraces, in the first instance, addition compounds and their salts suitable for use as dispersing agents and as dispersion stabilizers, obtainable by reacting polyisocyanates, hydroxy compounds and Zerewitinoff hydrogen as well as compounds containing at least one acidic functional group, hydroxy-group or alkoxysilyl-group, optionally in the presence of solvents and optionally in the presence of reaction catalysts, characterized in that they are obtainable by reacting polyisocyanates having an average functionality of 2.5 to 10

(a) with monohydroxycompounds of the Formula I $$Y-OH \qquad \qquad I$$

wherein Y has the following meanings:

(i) aliphatic and/or cycloaliphatic hydrocarbon groups with 8 to 30 carbon atoms, the hydrogen atoms of which may be partially replaced by halogens or aryl residues,
(ii) aliphatic, cycloaliphatic and/or aromatic groups containing at least one —O—, —NHCOO— and/or —COO— group, having an average molecular weight $M_n$ from 200 to 10,000, the hydrogen atoms of which may be partially replaced by halogens, in such an amount that 10 to 70%, preferably 15 to 45% and particularly preferably 20 to 40% of the NCO— groups are reacted; (b) the resulting reaction product is reacted with compounds of the Formula II $$G-(E)_n \qquad \text{II}$$

wherein E represents —OH, —NH$_2$, and/or —NHR (in which R represents an alkyl group having 1 to 4 carbon atoms) and n represents 2 or 3. and G represents an aliphatic, cycloaliphatic and/or aromatic group containing at least 2 carbon atoms having an average molecular weight $M_n$ of at most 3000, which may contain —O—, —COO—, —CONH—, —NHCOO—, —S—, —Si(CH$_3$)$_2$O— and/or —SO$_2$— groups, in such an amount that a further 1 to 50%, preferably 5 to 45% and particularly preferably 15 to 40% of the NCO— groups of the originally utilized polyisocyanate are reacted, whereby in the reactions (a) and (b) all total at least 20% and at most 85%, preferably 30 to 65% and particularly preferably 40 to 60% of the NCO— groups of the originally utilized polyisocyanate are reacted, (c) the resulting reaction product is reacted with at least one of the compounds of the Formula III $$Z-Q \qquad \text{III}$$

or IV $$Z-NH-Z \qquad \text{IV}$$

wherein Q represents —OH, —NH$_2$, —NHR (wherein R represents an alkyl group having 1 to 4 carbon atoms) or —SH, and each Z, which may be the same or different, represents an aliphatic and/or cycloaliphatic and/or aromatic residue having at least one acidic functional group and/or having at least one OH— group (optionallly present as an acetal) and/or having at least one Si(OR)$_m$(R')$_{3-m}$— group (wherein R and R' represent alkyl groups with 1 to 10 carbon atoms and m=1-3), in such an amount that at least 0.8 molecule of the compound Z—Q and/or Z—NH—Z is provided for each remaining isocyanate group not reacted in stages (a) and (b); and (d) optionally reacting hydroxyl groups contained in the resulting reaction product with polycarboxylic acids having at least 2 carboxyl groups or their anhydrides while substantially avoiding cross-linking reactions.

To produce the addition compounds according to the invention, mixtures of various compounds according to Formulas I, II, III and/or IV can also be utilized.

The reaction of the polyisocyanates with the compounds of Formulas I to IV can be carried out in a single reaction step or in several reaction steps. This can occur in desired sequence, whereby two reaction steps can also be combined. For example, after complete or partial reaction of the polyisocyanate with the corresponding amount of compound of Formula I, the further reaction can be initiated by adding a mixture of compounds of Formulas II, III and/or IV. In many cases it is advantageous to react the polyisocyanate in three individual stages successively with the components in the sequence I, II, III and/or IV. Particularly with compounds according to Formulas III or IV, which contain further NCO-reactive groups besides Q, it is useful to follow this sequence in order to avoid undesired effects such as the formation of poorly soluble reaction products or the retarding of isocyanate reactions by acidic groups.

The invention further includes the process of producing the addition compounds as described above. Furthermore, the invention includes processes for using the aforedescribed addition compounds as dispersing agents and as dispersion stabilizers. The invention also includes powdered or fibrous solids for incorporation into, i.e. dispersion in, liquid systems and which are coated with these addition compounds as dispersing agents and dispersion stabilizers.

Suitable powdered or fibrous materials include those which are coated with dispersing agents according to the prior art, particularly organic and inorganic pigments, which are utilized in paints, coatings, molding compositions or other synthetic resins, inorganic or organic fillers, which are utilized to fill or reinforce paints, coatings, molding compositions or other synthetic resins. A subgroup of this type of fillers is the group of organic and/or inorganic fibers, which likewise are utilized as fillers or reinforcing agents.

Examples of pigments are mono-, di-, tri- and polyazo pigments, oxazine pigments, dioxazine pigments, thiazine pigments, phthalocyanine and other metal complex pigments, indigo pigments, diphenylmethane pigments, triarylmethane pigments, xanthene pigments, acridine pigments, chinacridone pigments, methine pigments, anthrachinone pigments, pyrathrone pigments, perylene pigments and other polycyclic carbonyl pigments, inorganic pigments based on carbon black, graphite, titanium dioxide, zinc oxide, zinc sulfide, zinc phosphate, barium sulfate, lithophone, iron oxide, ultramarine, manganese phosphate, cobalt aluminate, cobalt stannate, cobalt zincate, antimony oxide, antimony sulfide, chromium oxide, zinc chromate, mixed metal oxides of nickel, titanium, zinc manganese, cobalt, iron, chromium, antimony, magnesium, aluminum (for example, nickel titanate yellow or chromium titanate yellow), magnetic iron oxides and chromium oxides, metallic pigments such as aluminum bronze, pearl finish pigments, fluorescent pigments and phosphorescent luminous pigments.

Examples of powdered or fibrous fillers are those which are composed of powdered or fibrous particles of aluminum oxide, aluminum hydroxide, silicon dioxide, infusorial earth, siliceous earth, quartz, silica gel, talcum, kaolin, mica, perlite, feldspath, ground shale, calcium sulfate, barium sulfate, calcium carbonate calcite, dolomite, glass, carbon.

Powdered or fibrous solids of this type with a coating of dispersing agent and dispersion stabilizer according to the invention are produced in a conventionally known manner, whereby in place of the known dispersing agents of the prior art, those according to the invention are utilized. In the fiber material field, these dispersing agents are commonly also called sizings or dressings. For this purpose the solids can, for example, be coated in a cyclone bed with a solution or emulsion of the addition compounds according to the invention. The solvent or emulsifying medium can then be removed, but it may also remain in the mixture so that pastes are obtained. Another possibility is, for example, that the solids to be coated are slurried in a liquid medium, and the addition compounds according to the invention are added to this slurry.

In this case too, the slurrying can be effected in such a way that a processable paste is obtained, whereby, naturally, the liquid medium used for forming the slurry is adapted to the latter use of this paste, for example as a pigment paste.

There are many posibilities for applying the addition compounds according to the invention to the solid surfaces of pigments. This process can take place during or after the synthesis of the pigments by addition of the addition compounds to an aqueous pigment suspension, to a pigment suspension in a water-solvent mixture or to a pigment suspension in solvents—optionally before, during or after a pigment finish—or during its further processing in the medium in which it is used.

The addition of the addition compound to an aqueous pigment suspension can take place in such solvents which are at least partially miscible with water, for example aliphatic alcohols having 1-6 carbon atoms such as ethanol, glycols, glycolethers and glycolesters such as propylene glycol, ethylglycol acetate, methoxypropyl acetate; ketones such as acetone, methylethyl ketone; carboxylic amides such as dimethyl formamide, N-methylpyrolidone.

In conjunction with a thermal post-treatment of a pigment—say to increase its covering power or to improve other technical characteristics—the addition of the addition compound advantageously takes place in the solvent in which the thermal post-treatment is carried out.

The addition of the addition compound or its solution can occur before, during or after a finish. The solvent can subsequently be driven off rapidly and quantitatively, e.g. by using steam, and the addition compound can be applied to the pigment surface especially simply and with a high degree of effectiveness. The thusly prepared pigment can subsequently be isolated from the remaining aqueous suspension.

The application of addition compound can also take place without prior or subsequent thermal treatment (finishing) of the pigment in that immediately after addition of the additive solution to the aqueous pigment suspension with intensive stirring, the solvent which is used is distilled off, e.g., with steam.

In the simplest case the dissolved addition compound can be utilized in the form in which it is produced without prior isolation to coat the pigment surface. If the addition compound is in a solvent—as a result of the synthesis—which leads to undesired color changes of the pigment or to technical problems when applied to the pigment suspension, it is advantageous to transfer the addition compound to a usable form suitable for the pigment in question, i.e. to partially or completely remove the solvent and optionally to replace it with a more suitable solvent.

If the addition compound has an acidic character, it may be of advantage to neutralize it with basic compounds such as amines or aminoalcohols or to make the pigment suspension weakly alkaline.

Compared to untreated comparison pigments, pigments prepared according to the invention are distinguished in lacquers by outstanding rheologic properties as well as by clearly improved gloss, viscosity and flocculation behavior, and frequently also by higher color intensity.

The use of the addition compounds according to the invention as dispersing agents and as dispersion stabilizers can also take place—as with known dispersing agents according to the state of the art—in such a way that the addition compounds are added to any systems, for example lacquers, synthetic resin mixtures and the like, in which the solids, which are to be worked in, are already dispersed.

As polyisocyanates for producing the addition compounds according to the invention, the compounds usable in this field of endeavor according to the state of the art are utilized. However, they must have an average functionality of 2.5 to 10. Examples of such polyisocyanates include those which can be obtained, for example, by addition of diisocyanates to polyols such as

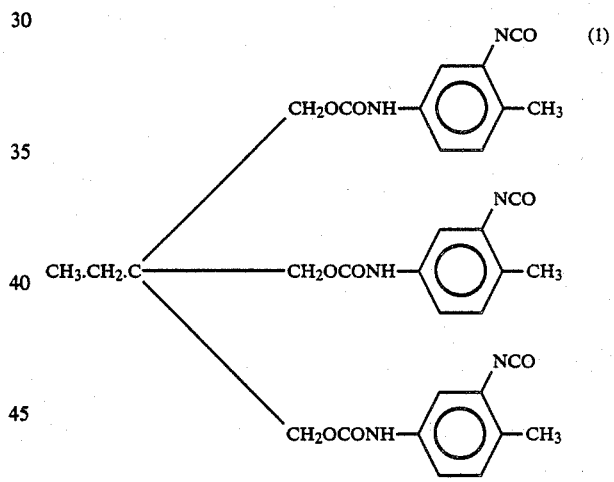

Commercial product: Desmodur L (Registered Trademark) or which can be obtained from diisocyanates through the Biuret reaction such as:

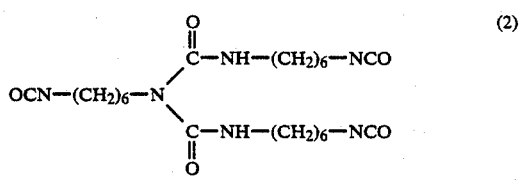

Commercial product: Desmodur N (Registered Trademark) or rather those polyisocyanates with an isocyanurate basic structure obtainable from diisocyanates through cyclization:

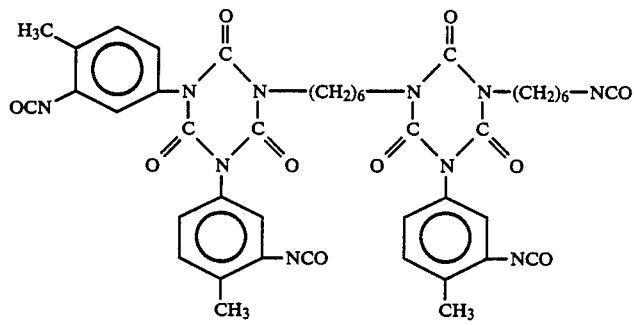
Commercial product: Desmodur HL (Registered Trademark)
(3)
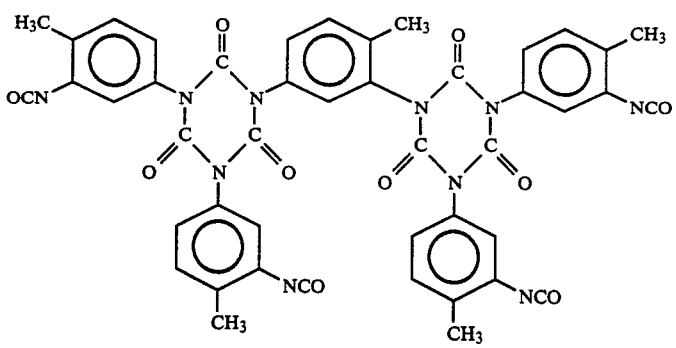
Commercial product: Desmodur IL (Registered Trademark)
(4)
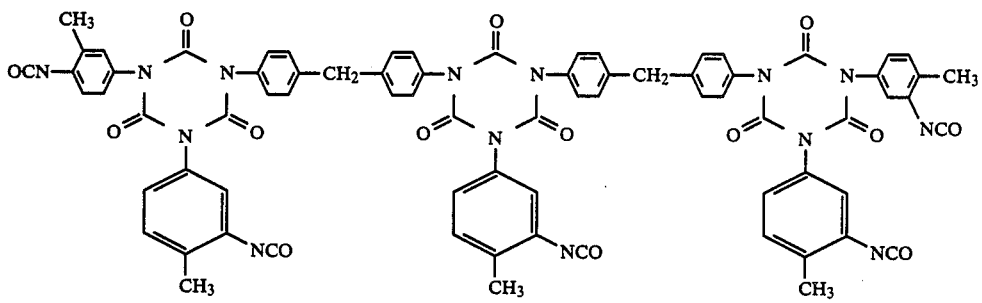
Commercial product: Polurene KC (Registered Trademark)
(5)
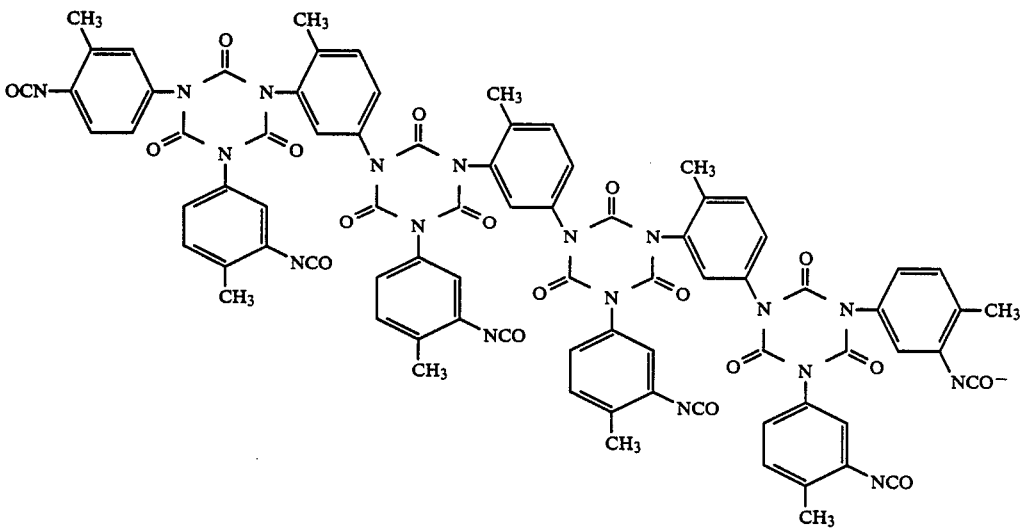
Commercial product: Polurene HR (Registered Trademark)
(6)

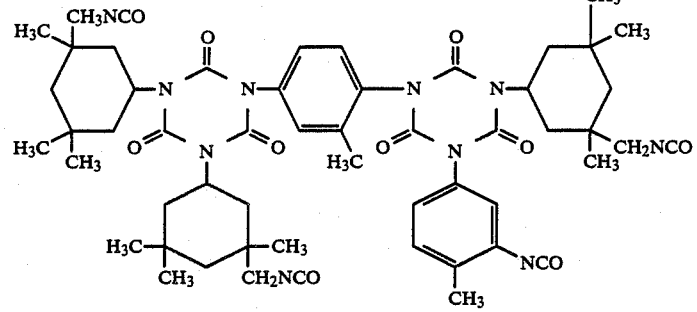

Toluene diisocyanate-isophorone diisocyanate-isocyanurate (from SAPICI)

(7)

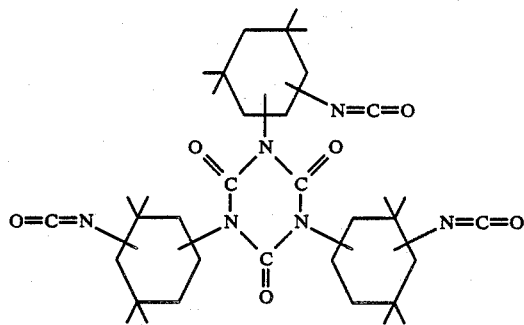

Trimeric isophorone diisocyanate (Isocyanurate T1890 from Chemische Werke Huels)

(8)

Further examples of polyisocyanates available as commercial products include Desmodur VL (polyisocyanate based on diphenylmethane diisocyanate (MDI) from Bayer), Desmodur A 4370 (polyisocyanate based on isophorone diisocyanate (IPDI) from Bayer), Polurene KD (polyisocyanate based on toluene diisocyanate (TDI) from SAPICI), Uronal RA.50 (polyisocyanate based on TDI from Galstaff), Polurene A (polyisocyanate based on TDI-trimethylol propane (TMP) from SAPICI), Polurene MC (polyisocyanate based on TMP-IPDI from SAPICI), Polurene MD.70 (polyisocyanate based on TMP-TDI-MDI from SAPICI.

These compounds represent commercial products which frequently are not provided in pure form, but instead designate mixtures of compounds of similar structure. The term "average functionality" is understood to mean that, as pertaining to their isocyanate groups, the commercial products have the indicated functionality from 2.5 to 10, preferably 3 to 6. For example, a "functionality of 3" means that a molecule on the statistical average contains 3 free isocyanate groups. The average functionality can be determined experimentally by determining the average molecular weight $M_n$. Additionally the NCO number is determined and the NCO equivalent weight is calculated therefrom. The average functionality is the quotient of the average molecular weight and the NCO equivalent weight.

As monohydroxy compounds of Formula I, aliphatic, cycloaliphatic and/or araliphatic compounds can be used having in each case 8 to 30 carbon atoms. Mixtures of such compounds can also be used.

Straight chain and branched aliphatic or araliphatic compounds can be utilized. They may be saturated or unsaturated. Saturated compounds are preferred. The hydrogen atoms may be partially replaced by halogens, preferably by fluorine and/or chlorine. If such substituted compounds are utilized, they are preferably aliphatic monoalcohols. Products of this type are commercially available, whereby, as those skilled in the art known, the carbon atoms adjacent the hydroxy group as a rule do not bear halogens. Examples of specially fluorinated alcohols include heptadecafluorodecanol or $C_6F_{13}CH_2CH_2OH$. The corresponding commercially avaiable products are often not pure compounds, but instead may be mixtures of various fluorinated compounds as are obtained in industrial synthesis.

As monohydroxy compounds of Formula I, compounds can also be used which contain at least one —O—, —NHCOO—, and/or —COO— group. This therefore includes polyethers, polyesters, polyurethanes, polyacrylic acid esters, polymethacrylate acid esters, mixed polyether-polyesters, polyether-polyurethanes, polyester-polyurethanes, or polyether-polyester-polyurethanes. Examples of polyesters include those which can be obtained by polymerization of a lactone, such as propiolactone, valerolactone, caprolactone or their substituted derivatives by means of a monohydroxy starting component. As the starting component, monoalcohols, advantageously having 4 to 30 C-atoms, preferably 4 to 14 C-atoms, are utilized, such as n-butanol, long chain saturated and unsaturated alcohols such as propargyl alcohol, oleyl alcohol, linoleyl alcohol, oxo alcohols, cyclohexanol, phenylethanol, neopentyl alcohol, and also fluorinated alcohols as mentioned above. Alcohols of the aforedescribed type and substituted and unsubstituted phenols can also be converted through alkoxylation by known methods with ethylene oxide and/or propylene oxide into polyoxyalkylene monoalkyl ethers, polyoxyalkylene monoaryl ethers, polyoxyalkylene monoaralkyl ethers and cycloalkyl ethers, and these monohydroxy polyethers can be used in the aforedescribed manner as starting components for the lactone polymerization. Mixtures of the aforementioned compounds can also be utilized.

This lactone polymerization is initiated following known procedures by, for example, p-toluenesulfonic acid or dibutyltin dilaurate, carried out at temperatures of about 100° C. to 180° C., and proceeds according to the following exemplary reaction scheme.

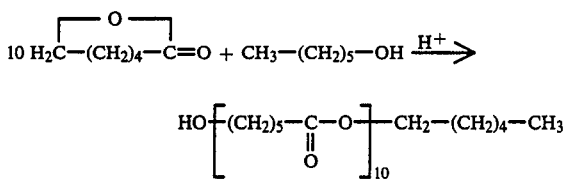

These polyesters advantageously have a molecular weight in the range from about 350 to 10,000, preferably 500 to 5,000, whereby compounds obtained by lactone polymerization in the aforedescribed manner are preferred. Saturated monoalcohols having 4 to 18 C-atoms are preferred as starter components.

Other examples of polyesters include those which can be obtained through condensation of a glycol and a dibasic acid in the presence of monohydroxy compounds. The formation of dihydroxypolyesters can be suppressed through use of corresponding stoichiometric amounts of monohydroxy compounds as described above.

The reaction proceeds according to the following exemplary reaction scheme:

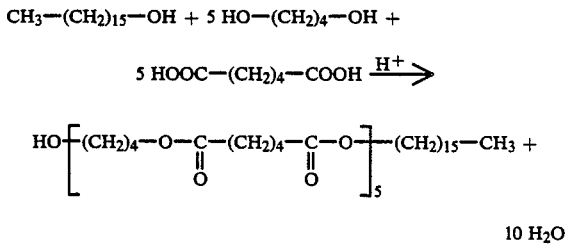

Advantageously, these polyesters have an average molecular weight of 400 to 2,500, preferably from 800 to 1,500.

A further example are polyesters which can be obtained through condensation of a hydroxycarboxylic acid in the presence of monohydroxy compounds, as they are described above, in order to control the molecular weight. The reaction proceeds according to the following exemplary reaction scheme:

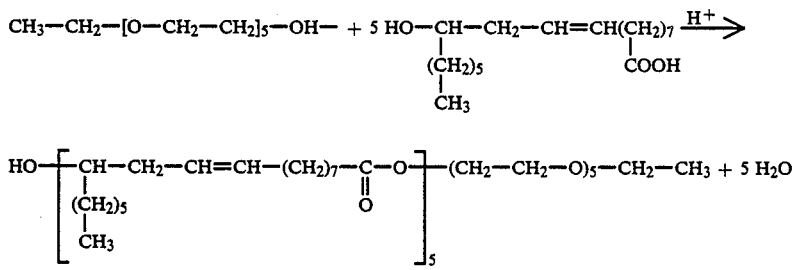

In this case, the average molecular weight of the polyester amounts advantageously to 600 to 3,000, preferably 800 to 1,500.

Monohydroxypolyethers can also be utilized as compounds of Formula I, as they are obtained through alkoxylation of alkanols, cycloalkanols and phenols. These polyethers advantageously have a molecular weight in the range from about 350 to 1,500.

As compounds of Formula I in which Y has meaning (ii), monohydroxyfunctional polyacrylic acid esters and/or polymethacrylic acid esters can also be utilized, as they are obtained through polymerization of acrylic acid esters or methacrylic acid esters with the addition of a monohydroxyfunctional polymerization regulator. Such compounds are already used in this field of technology to produce other dispersing agents, as they are described, for example in U.S. Pat. No. 4,032,698. The production of these compounds through radical polymerizaton proceeds according to the following exemplary reaction scheme:

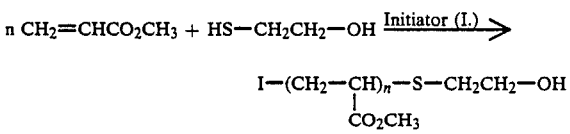

These polyacrylates advantageously have an average molecular weight $M_n$ of 300 to 10,000, preferably 500 to 5,000.

As persons skilled in the art know, the control of the desired average molecular weight takes place through the regulator concentration and initiator concentration and the reaction temperature: the higher the temperature, the regulator concentration and the initiator concentration, the lower the resulting average molecular weight will be.

To control the reaction, the conventional regulators of the prior art (for example, 2-mercaptoethanol, 2-mercaptopropanol) and initiators of the prior art (for example, dibenzoyl peroxide, azobisisobutyronitrile, etc.) can be used.

Desirably, for better control of temperature, the polymerization is carried out discontinuously under reflux in a suitable inert solvent at temperatures of about 50°–120° C. At high monomer contents, it is usual to start with the larger part of the solvent and only a small amount of the reactants and to add the remainder of the reaction solution in accordance with the progress of the reaction.

The carboxyl group of the monomeric acrylate or methacrylate may be esterified with aliphatic, cycloaliphatic and/or aromatic alcohols such as methanol, butanol, cyclohexanol, 2-ethylhexanol, lauryl alcohol, stearyl alcohol, isobornyl alcohol, benzyl alcohol or with ether alcohols such a 2-methoxyethanol, 2-phenoxyethanol, tetrahydrofurfuryl alcohol, glycidol or with polyester alcohols such as hydroxyfunctional polycaprolactone, or with alkoxypolyalkylene glycols such as methoxypolyethylene glycol, methoxypolypropylene glycol. The average molecular weight $M_n$ of the esterification component thereby advantageously lies below 2,000. Mixtures of various of the monomers described above can also be utilized to produce the hydroxyfunctional polyacrylates or polymethacrylates.

To produce these polyacrylates or polymethacrylates vinyl esters such a vinyl acetate, vinyl ethers such as vinylethyl ether, styrene, vinyl toluene and/or vinyl cyclohexane can also be utilized as co-monomers. The resulting copolymers thereby advantageously contain not more than 50 mole-% of comonomers which do not contain an acrylic functional group.

Polyurethanes, polyether-polyurethanes, polyester-polyurethanes and/or polyether-polyester-polyurethanes, which can be obtained through the addition reaction of a diisocyanate with a dihydroxy compound in the presence of a monohydroxy compound, can also be utilized as monohydroxy compounds of Formula I. The reaction proceeds according to the following exemplary reaction scheme:

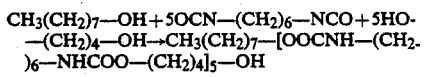

$CH_3(CH_2)_7-OH+5OCN-(CH_2)_6-NCO+5HO-(CH_2)_4-OH \rightarrow CH_3(CH_2)_7-[OOCNH-(CH_2)_6-NHCOO-(CH_2)_4]_5-OH$ In this case the average molecular weight $M_n$ of the polyaddition compound advantageously amounts to 300 to 6,000, preferably 500 to 3,000.

In this polyaddition mixtures of monofunctional and difunctional compounds with nonfunctional compounds are generally produced. The formation of difunctional compounds can by suppressed through the use of corresponding stoichiometric amounts of monohydroxy compounds. Furthermore, by carrying out the reaction selectively, i.e. at a low reaction temperature and in a step-wise manner, the formation of byproducts which are not monofunctional can be suppressed. This applies in particular when starting materials with functional groups having different reactivities are used such as isophorone diisocyanate, 2,4-toluene diisocyanate, 1,2-butanediol.

The byproducts which occur in admixture with the monohydroxy compounds generally do not interfere with the further reaction. Therefore, the reaction products as obtained can be used without further ado to react with the polyisocyanates.

The known aliphatic, cycloaliphatic and/or aromatic diisocyanates with 4 to 15 carbon atoms from polyurethane chemistry can be utilized as diisocyanates such as tetramethylene diisocyanate, hexamethylene diisocyanate, trimethylhexamethylene diisocyanate, dodecamethylene isocyanate, isophorone diisocyanate, toluene diisocyanate, diphenylmethane diisocyanate, methylenebis(-4-cyclohexylisocyanate) or 1,4-cyclohexanebis(methylisocyanate). As dihydroxy compounds for the formation of urethane-group containing compounds according to Formula I, diols with 2 to 12 C-atoms, polyoxyalkylene glycols and dihydroxyfunctional polyesters with preferred molecular weights of at most 2,000 are advantageously utilized, as they are also described as compounds according to Formula II. Monoalcohols with up to 30 C-atoms, as already described for producing polyesters of Formula I, and also the monohydroxy polyesters and monohydroxy polyethers described as compounds of Formula I, can be utilized as starting component. The polyesters advantageously have a molecular weight of 300 to 5,000 and the polyethers from 200 to 2,000.

Through the reaction of the polyisocyanate with the compounds of Formula I, a portion of the free isocyanate groups is caused to react with the hydroxy groups of the compounds of Formula I. Desirably, on average, at least 0.7, preferably about 1 molecule of Formula I are reacted with each one molecule of polyisocyanate, so that about 1 compound of Formula I is attached to each polyisocyanate molecule. If polyisocyanates with an average functionality of more than 3 are utilized, a larger amount of compound of Formula I can also be utilized. Usually, on each polyisocyanate molecule at least 2, with polyisocyanates having an average functionality of less than 4 about 2, isocyanate groups should remain unreacted, of which, in the simplest case, in the further reactions about one isocyanate group serves for crosslinking with the compounds of Formula II and about one isocyanate group is reacted with compounds of Formula III or Formula IV. Depending on the functionality of the polyisocyanate which is used and of the compounds of Formula II, the individual proportions can be selected with corresponding application of these principles. For specific applications it may also be meaningful, however, to deviate from the foregoing reaction relationships.

The resulting reaction product is then reacted with compounds of Formula II. This reaction may take place in the same vessel as the reaction with the compounds of Formula I. It is also possible in some cases to react the polyisocyanate with a mixture of compounds of Formulas I and II. In reaction (a) with compounds of Formula I, 10 to 70% of the NCO— groups of the originally utilized polyisocyanate are reacted. The lower limit preferably lies at 15% and particularly preferably at 20%. The upper limit preferably lies at 45%, and particularly preferably at 40%, in some cases even at only 30%.

In the reaction (b) with the compounds of Formula II, a further 1 to 50% of the NCO— groups of the originally utilized polyisocyanate are reacted. The lower limit preferably lies at 5% and particularly preferably at 15%. The upper limit advantageously lies at 45%, preferably at 40% and in some cases preferably at 30%.

All total, however, in the reactions (a) and (b) at least 20% and at most 85% of the NCO— groups of the originally utilized polyisocyanate are reacted, whereby the lower limit preferably lies at 30%. The upper limit advantageously lies at 65%, preferably at 60% and in some cases preferably at 50%. Thus, for example, if in accordance with (a) the originally utilized polyisocyanate is reacted with compounds of Formula I in such amounts that 15% of the NCO— groups are reacted, in reaction (b) the compounds of Formula II must be utilized in such amounts that at least 5% of the NCO— groups of the originally utilized polyisocyanate are reacted thereby, yielding all total 15+5=20%.

The compounds of Formula II differ substantially from those of Formula I in that they contain two or three functional groups which react with isocyanate groups. Preferably these functional groups are hydroxyl groups because these compounds are easily accessible and are commercially available and the resulting reaction products are readily soluble in solvents which are used in later utilization of the dispersing agents according to the invention. Examples of compounds of Formula II include diols and triols or diamines, dialkanol amines, monoalkanolamines with 2 to 12 C-atoms, dihydroxydialkylsulfides and dihydroxysulfones such as butanediol, hexanediol, cyclohexanediomethanol, neopentyl glycol, ethylene glycol, alkyl substituted dialkanolamines, glycerin, trimethylolpropane, fatty acid dialkanol amides, thiodiglycols, di(4-hydroxyphenyl)-sulfones, bis(hydroxyalkyl)polydimethylsiloxanes, hydroxyfunctional polybutadienes with an average functionality of 2 to 3. A preferred group of compounds of Formula II are polyoxyalkylene glycols, advantageously with alkylene groups having 2 to 4, preferably 2, carbon atoms, and preferably having molecular weights in the range from advantageously 400 to 2,000, preferably 600 to 1,500. Ethoxylates with 3 hydroxy groups are obtained by polymerization using trifunctional alcohols as starter components. Polyethylene glycols are preferred as polyoxyalkylene glycols.

As compounds of Formula II, those compounds can also be used which can be obtained by polymerization of a lactone, as previously explained, with by means of dihydroxy or trihydroxy starting components. Advantageously these polyesterpolyols have an average molecular weight $M_n$ of 800 to 2,000. As starting components, butanediol or ethylene glycol is preferred. However, the above-mentioned diols or triols are also possible starting components.

As compounds of Formula II, polyurethanes, polyether-polyurethanes, polyester-polyurethanes and/or polyether-polyester-polyurethanes can also be utilized, which can be obtained through an addition reaction of a diisocyanate with a dihydroxy compound analogous to the corresponding compounds of Formula I. The diisocyanates and dihydroxy compounds already mentioned in (the discussion of) the corresponding urethane-containing compounds of Formula I, can be utilized as reaction components. The compounds produced in this manner have an average functionality of 2. The corresponding trifunctional compounds can be produced by using a small amount of a trifunctional starting component. As trifunctional starting components, triisocyanates as in the compounds illustrated in Formulas (1), (2) and (8), the aforementioned triols, and also the above-mentioned trihydroxyfunctional polyesters and polyethers can be utilized. Desirably, these urethane-containing compounds according to Formula II have an average functionality of 2 and an average molecular weight of 300 to 2,500, preferably of 500 to 1,500.

The compounds of Formula II effect a crosslinking between the reaction products of the polyisocyanate and the compounds of Formula I. In the simplest case, the starting products are used in such amounts that the compounds of Formula II represent the center of the molecule, and the polyisocyanates are bound to the compounds of Formula II through the groups E; the remaining isocyanate groups of the polyisocyanates are reacted with the compounds of Formula I or will be reacted with the compounds of Formulas III or IV. Naturally, a certain over-crosslinking or undercrosslinking can also occur.

Too much over-crosslinking can be prevented to a certain extent by working in dilute solutions in strongly polar, aprotic solvents, such as dimethylformamide, dimethylacetamide, and N-methylpyrrolidone. The thusly obtained reaction products are reacted with compounds of Formula III and/or IV in such an amount that least 0.8 molecule of Formula III and/or IV is provided for each remaining isocyanate group not yet reacted in steps (a) and (b). If the compounds of Formula III and/or IV contain only one group which can react with the isocyanate groups, an excess is not necessary; but rather, approximately 1 molecule of Formula III and/or IV is utilized for each as yet unreacted isocyanate group. If the compounds of Formulas III and/or IV contain more than one group which can react with the isocyanates, it is also sufficient if for each as yet unreacted isocyanate group 1 molecule of Formula III or IV is provided, however no large insufficiency should be utilized in order to avoid undesired crosslinking. A slight excess can be advantageous to avoid an undesired crosslinking. In general, an excess of 25, preferably 10, mole-% is sufficient.

Advantageously, as compounds of Formula III and/or IV, compounds are used in which the average molecular weight $M_n$ is not greater than about 1,000 and the residues Z of which contain not more than 5, and preferably 3, functional groups according to claim 1 c. The compounds of Formulas III and/or IV are characterized in that they contain one or two aliphatic, cycloaliphatic and/or aromatic residues Z which carry at least one acidic functional group, at least one OH-group or at least one alkoxysilyl-group, whereby as a rule alkoxysilylgroup containing compounds do not also carry acidic groups or hydroxyl groups in the molecule. In appropriate cases hydroxyl groups contained in the organic residues Z can be present as acetals.

As acidic functional groups, the carboxyl group, the sulfonic acid group and the phosphonic acid group are preferred, and the carboxyl group is particularly preferred.

The compounds of Formula III are further characterized in that they contain a group Q which is capable of reacting with isocyanate groups. Examples of such groups include —OH, —NH$_2$, —NHR (wherein R represents an alkyl group with 1 to 4 carbon atoms) and —SH. Preferably Q in Formula III represents —NH$_2$ or —SH.

Fundamentally, every acidic compound can be used as a compound of Formula III so long as it carries a group capable of reacting with isocyanates. Such compounds are also already utilized in this field of technology for producing other dispersing agents, for example, as described in U.S. Pat. No. 4,029,861. Examples of compounds of Formula III include mercaptoacetic acid, mercaptopropionic acid, mercaptosuccinic acid, mercaptobenzoic acid, ricinoleic acid, 12-hydroxystearic acid, hydroxyacetic acid, hydroxysuccinic acid, hydroxybutyric acid, aminobutyric acid, 4-aminophenylacetic acid, p-aminobenzoic acid, aminoacetic acid, hydroxyethanesulfonic acid, hydroxypropanesulfonic acid, mercaptoethanesulfonic acid, aminomethanesulfonic acid, 3-aminopropanesulfonic acid, sulfanilic acid, N-(2-hydroxyethyl)ethylenediamine triacetic acid, N-(2-hydroxyethyl)imino diacetic acid, 4-aminobenzenephosphonic acid, and 3-aminopropane-1-phosphonic acid.

As compounds of Formula III, compounds which contain an organic residue Z with one or more OH-groups can also be utilized. These may be organic polyols such as, for example, ethylene glycol, propylene glycol, 1,12-dodecanediol, 1,4-bis(hydroxymethyl)cyclo-hexane, phenylethylene glycol, diethylene glycol, triethylene glycol, dipropylene glycol, 2-butene-1,4-diol, 3-hexene-2,5-diol, glycerin, 1,2,4-butanetriol, triethanolamine, 2,2-bis(hydroxymethyl)-1,3-propanediol, 1,2,7,8-octanetetrol, dipentaerythritol, N,N,N',N'-tetrakis(2-hydroxypropyl)ethylene diamine. Monohydroxy compounds or polyhydroxy compounds which contain a primary amino group are preferred compounds of Formula III, such as, for example, ethanol amine, 3-aminopropanol, isopropanol amine, 2-methylaminoethanol, 2,2'-aminoethoxyethanol, 1-aminopropane-2,3-diol, 2-amino-2-ethylpropane-1,3-diol, 2-butylaminoethanol, tris(hydroxymethyl)aminoethane, 2-cyclohexylaminoethanol, 3-amino-2,2-dimethyl-1-propanol, 4-amino-1-butanol, 2-amino-1-phenylpropane-1,3-diol.

If, as described above, compounds with several NCO-reactive groups, such as, for example, polyols or aminoalcohols, are utilized as compounds of Formula III, the course of the reaction is dependent both on the varying reactivities of the individual NCO-reactive groups as well as on the reaction conditions. If the compound which is used contains a primary or secondary amino group as the NCO-reactive group Q, then the addition takes place practically exclusively through the amino function which is extremely reactive toward isocyanates, so that a selective course of the reaction is assured. If, in contrast, the compound Z—Q to be used contains OH— groups with approximately equal NCO-reactivity both in Q and also in Z, the addition to the polyisocyanate can take place both through Q and also through Z. This is, however, of no consequence for the use of the resulting addition products as dispersing agents or dispersion stabilizers, particularly when symmetrical diols or polyols are used. The only important thing is that approximately one molecule Z—Q is provided for each NCO— group to be reacted, in order to avoid formation of nonfunctional addition products. In some cases, it can therefore also be advantageous to utilize a slight excess of Z—Q.

If compounds which have one or more 1,2- or 1,3-diol functions in the group Z are utilized as compounds of Formula III, it is possible to protect these diol functions prior to reaction with the NCO— groups through acetalization with aldehydes or ketones such as, for example, formaldehyde or acetone. This makes possible a selective reaction of the remaining free NCO-reactive groups. After the addition to the isocyanate groups, the protective group can be split off in a slightly acidic medium. In some cases, however, it is also possible to utilize the resulting addition compounds as dispersing agents and as dispersion stabilizers without previous hydrolysis of the acetal groups, especially for pulverulent solids with acidic surfaces. Compounds with 1,3-dioxolane structure or 1,3-dioxane structure are obtained through the acetal formation. These structures are stable in alkali or neutral media and can be easily hydrolyzed through acid catalysis.

Acetal formation and hydrolysis takes place according to the following exemplary reaction scheme:

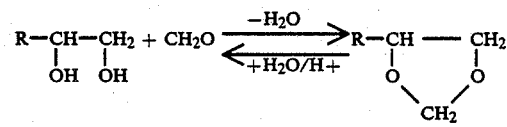

Examples of compounds according to Formula III with diol groups protected through acetal formation (acetalization) include monoisopropylidene diglycerin, diisopropylidene triglycerin, diisopropylidene tetraglycerin, isopropylidene glycerin, glycerin formaldehyde.

Compounds containing at least one alkoxysilyl group can also be utilized as compounds of Formula III. Examples include 3-aminopropyltrimethoxysilane, 3-aminopropyltriethoxysilane, 3-mercaptopropyltrimethoxysilane, p-aminophenyltriethoxysilane, 4-aminobutyltriethoxysilane, 4-aminobutyldimethylmethoxysilane, N-2-aminoethyl-3-aminopropyltrimethoxysilane, bis-[3-(triethoxysilyl)propyl]amine and trimethoxysilylpropyldiethylene triamine.

The compounds of Formula IV are characterized in that they contain a secondary amino group capable of reacting with isocyanate groups, which carries two organic residues Z, which may be the same or different, and contain at least one acidic functional group, at least one OH-group or at least one alkoxysilyl group.

Examples of compounds according to Formula IV include ethylenediamine-N,N'-diacetic acid, ethylenediamine-N,N'-bis[2-(2-hydroxyphenyl)acetic acid]ethanolaminoacetic acid, diethanolamine, diisopropanolamine, bis[3-(triethoxysilyl)-propyl]amine.

If a compound according to Formulas III or IV is utilized in which the organic residue Z carries one or more OH-groups, then one obtains a product which, depending on the relative amounts utilized, contains one or more hydroxyl groups. These products may be used without further reaction as dispersing agents or dispersion stabilizer. In individual cases it can also be desirable, particularly for dispersing certain pigments with surfaces having a basic character, to further react the OH-groups in such a way that a product with acidic functional groups is produced. Such a transformation can be achieved by reacting the OH— groups with such an amount of dicarboxylic acids or tricarboxylic acids or their anhydrides that crosslinking reactions are substantially avoided. The resulting formation of an acidic carboxylic acid ester, for example with a 1,2-dicarboxylic acid anhydride, proceeds according to the following reaction scheme:

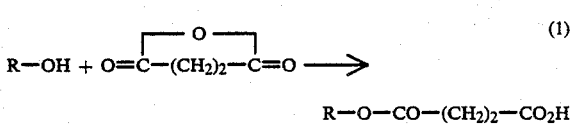

Crosslinking reactions during the addition of polycarboxylic acids or their anhydrides to OH-functional compounds obtained after reaction step (c) can, as known to persons skilled in the art, be substantially avoided by reacting at least 0.8 molecule, preferably about 1 molecule, of polycarboxylic acid or polycarboxylic acid anhydride with each OH-group to be reacted. A slight excess of polycarboxylic acid or polycarboxylic acid anhydride can be useful to avoid crosslinking reactions. In general, an excess of about 25 mole-%, preferably 10 mole-%, is sufficient.

As reaction partners for esterification reactions of this type, all polycarboxylic acids or poylcarboxylic acid anhydrides usable for esterification reactions in the prior art can be utilized, such as, for example, succinic acid maleic acid, fumaric acid, acetylenedicarboxylic acid, glutaric acid, adipic acid, 1,10-dodecanedicarboxylic acid, terephthalic acid, diglycolic acid, benzene-1,2,4-tricarboxylic acid, propene-1,2,3-tricarboxylic acid, benzene-1,2,3,4-tetracarboxylic acid, succinic acid anhydride, maleic acid anhydride, glutaric acid anhydride, dodecenyl succinic acid anhydride, phthalic acid anhydride, 1,2-cyclohexanedicarboxylic acid anhydride, benzene-1,2,4-tricarboxylic acid 1,2-anhydride, pyromellitic acid anhydride, 3,4,5,6-tetrachlorophthalic acid anhydride, 1,4,5,6-tetrachlorophthalic acid anhydride, 1,4,5,6,7,7-hexachloro-5-norborene-2,3-dicarboxylic acid anhydride.

As known to persons skilled in the art, the esterification reaction of an alcohol generally proceeds substantially more easily with a carboxylic acid anhydride than with the correponding dicarboxylic acid. Therefore, in the molar reaction of alcohols with the anhydrides of polycarboxylic acids, the anhydride groups preferably enter into the reaction, while the free carboxyl groups which may be present or formed in the course of the half-ester formation remain substantially unreacted. This permits the reaction to be carried out selectively with substantial avoidance of crosslinking reactions. However, the selectivity of the anhydride reaction decreases with increasing reaction temperature. Advantageously, therefore, to achieve a selective reaction, the anhydride addition should be carried out, if possible, at temperatures below 150° C. For the aforementioned reasons it is advantageous for reaction step (d) to utilize the polycarboxylic acids in the form of their anhydrides whenever possible.

As known to persons skilled in the art, acidic functional groups such as, for example, carboxyl groups, are in principle also capable of reacting with NCO— groups. However these reactions proceed significantly more slowly than the addition of the functional groups used as the groups Q in the addition compounds according to the invention to the NCO— groups. Due to this differing reactivity, compounds which in addition to acidic groups also carry amino groups, hydroxy groups, or mercapto groups in the molecule add practically exclusively through these latter groups to NCO— groups while maintaining the acidic functions.

If therefore compounds with acidic groups are utilized as compounds of Formula III or IV or hydroxyl group-containing products obtained following reaction step (c) are reacted with polycarboxylic acids or their anhydrides in accordance with reaction step (d), then these acidic groups likewise lend an acidity to the addition compounds according to the invention, as is known to persons skilled in the art.

Through these acidic groups, the addition compounds are enabled to form salts. They can also be utilized in the form of such salts as dispersing agents within the scope of the invention. These salts are obtained from the resulting reaction product through neutralization with organic or inorganic bases.

The production of the addition compounds of the invention can be carried out in the presence of suitable solvents or solvent mixtures in accordance with the state of the art. All solvents are suitable which are inert with respect to the reactants or the reactivity of which toward the reactants is negligible and in which the reactants and the reaction products are at least partially soluble. For example, suitable solvents include hydrocarbons such as toluene, xylene, chlorinated hydrocarbons such as chloroform, trichloroethane, cyclic and acyclic ethers such as dioxane, tetrahydrofuran, polyalkylene glycol dialkylethers, esters such as ethyl acetate, butyl acetate, butyrolactone, alkylglycol esters such as ethylglycol acetate, methoxypropyl acetate, ketones such a methylisobutyl ketone, cyclohexanone, acetone, acid amides such as dimethyl formamide, N-methylpyrolidone, etc.

Advantageously the solvent or solvents are selected with a view toward the intended field of use. For example, in the production of addition compounds according to the invention for use in water dilutable lacquer systems or for coating pigments in aqueous suspension after synthesis of the pigment solvents which are partially or completely water dilutable are advantageously utilized. Depending on the field of use, the solvents used for the synthesis may remain in the reaction mixture or may be partially or entirely removed and optionally replaced by other solvents.

The solvents can be partially or completely removed, for example, through distillation, optionally at reduced pressure and/or azeotropically with the addition of water. The active substance can also be isolated, however, by precipitation through addition of non-solvents such as aliphatic hydrocarbons, for example hexane, subsequent separation by filtration, and drying in appropriate cases. The active substance obtained following one of these methods can then be dissolved in a suitable solvent for the respective field of use or can optionally be used in pure form, for example in powdered paints. Optionally, the solvent in which the addition product is dissolved can be distilled off after addition of suitable higher boiling solvents, optionally at reduced pressure and/or azeotropically with addition of water, and the addition product can thereby be transferred to a suitable solvent for the respective field of use.

Furthermore, the reactions can be carried out in the presence of conventional catalysts, for example organic tin compounds, such as dibutyltindilaurate, other organometallic compounds such as iron acetylacetonate, tertiary amines such as triethylene diamine. In this regard, reference is made to the patents cited at the beginning of the specification.

Through variation of the substituents (of the compounds) of Formulas I and II and/or their relative amounts, the compatability of the addition compounds of the invention can be adapted to the most diverse polymer compounds present in coating and molding compositions in which the addition compounds according to the invention may be used. If, for example, the binder in a lacquer (paint) is a polyester, it is advantageous to utilize such addition compounds according to the invention therefor which also contain polyester groups or similar groups in their molecule as a result of the groups contained in the starting compounds of Formulas I or II, which, as known to persons skilled in the art, are compatible with polyesters. The same applies in a similar sense to, for example, polyethylene or polyamide. Such addition compounds according to the invention which contain groups which exhibit little polarity are particularly compatible herewith. In a similar sense this applies to the substituents of Formulas III or IV, which are especially influential on the affinity of the addition compounds according to the invention for the solids which are used and which are to be dispersed.

The invention is additionally explained by the following examples. Parts refer to parts by weight, unless otherwise indicated. In molecularly non-uniform compounds, such as polymers, the stated molecular weights are average values according to the number average ($M_n$). The molecular weight or average molecular weights $M_n$ can be determined following usual procedures, for example, by determining the OH-number, the amine-number or cryoscopically.

The NCO content of the polyisocyanate which is utilized as well as the course of the addition reaction are determined by methods as described in Saul Patai "The Chemistry of Cyanates and their Thioderivates", Part I, Chapter 5, 1977.

The quantitative determination of the carboxylic acid anhydride content takes place according to methods as described in Houben-Weyl "Methoden der organischen Chemie", Band II, s. 510, 1953.

PRODUCTION EXAMPLES FOR COMPOUNDS OF FORMULA I

Polyester A:

Under a protective atmosphere, 4.9 parts n-butanol and 95.1 parts caprolactone are homogenized, combined with 0.002 parts dibutyltin dilaurate and heated to 160° C. Stirring was carried out at this temperature until a solids content of 98% was achieved. The resulting polyester had an average molecular weight $M_n$ of 1,500.

POLYESTERS B THROUGH G

A procedure analogous to that used for the production of polyester A was followed, however, in place of n-butanol and caprolactone, the stated amounts of the compounds listed in the table were used.

| Polyester | $\overline{M}_n$ | Starting Material | Parts |
|---|---|---|---|
| B | 1000 | 2-Ethylhexanol | 13,0 |
|   |      | Caprolactone | 87,0 |
| C | 1100 | 2-Phenylethanol | 11,4 |
|   |      | Caprolactone | 88,6 |
| D | 2000 | Heptadecafluordecanol | 2,2 |
|   |      | 2-Ethylhexanol | 5,9 |
|   |      | Caprolactone | 91,9 |
| E | 1500 | Stearylalkohol | 18,0 |
|   |      | δ-Valerolactone | 82,0 |
| F | 1500 | Polyethylenglykolmonomethylether ($\overline{M}_n$ = 550) | 35,3 |
|   |      | Caprolactone | 64,7 |
| G | 1200 | 2-Phenylpropanol-1 | 11,5 |
|   |      | Caprolactone | 88,5 |

Polyester H

Under a protective gas, 42.2 parts of ricinolic acid and 7.8 parts tripropyleneglycol monomethyl ether were heated to boiling with 50 parts xylene. The resulting water of reaction was removed from the mixture through azeotropic distillation. The reaction is terminated as soon as no more water can be separated. After distilling off the solvent at reduced pressure, a monohydroxy polyester with an average molecular weight of 1,300 is obtained.

Polyester K

Analogous to Example H, 43.6 parts 12-hydroxystearic acid were reacted with 6.4 parts 2-phenylethanol to obtain a polyester with $M_n$=950.

PRODUCTION EXAMPLES FOR COMPOUNDS OF FORMULA II

Polyester L

Analogous to Example A, 16.8 parts dodecane-1,12-diol and 83.2 parts caprolactone were reacted to obtain a polyesterdiol with $M_n$=1,200.

GENERAL PRODUCTION PROCEDURE FOR EXAMPLES 1 THROUGH 21

Step a: Under a protective gas, the starting materials listed in the table were combined in the indicated relative amounts, mixed with 0.01 parts dibutyltin dilaurate and stirred at 80° C. The first stage is terminated as soon as the amount of originally utilized NCO-groups given in the table has reacted.

Step b: After completion of the first stage, the components of step (b) are added and the reaction mixture stirred further at 80° C. until the degree of NCO conversion given in the table has been achieved.

Step c: To react the remaining NCO— groups the reaction mixture is combined with the components of step (c) and stirred 1 additional hour at 80° C.

The solids of the resulting products are listed in the following table.

The following polyisocyanates are utilized in the production examples (the numbering refers to the Formulas shown in the preceding text):

Polyisocyanate (1): Aromatic polyisocyanate based on toluene diisocyanate (TDI) according to Formula (1); 75% solution in ethyl acetate; e.g. Desmodur L.

Polyisocyanate (2): Aliphatic polyisocyanate based on hexamethylene diisocyanate (HMDI) according to Formula (2); 75% solution in xylene/ethyl glycol acetate 1:1; e.g. Desmodur N.

Polyisocyanate (3): Aromatic-aliphatic polyisocyanate based on HMDI/TDI according to Formula (3); 60% solution in ethyl acetate; e.g. Desmodur HL.

Polyisocyanate (4): Aromatic polyisocyanate based on TDI according to Formula (4); 51% solution in butyl acetate; e.g. Desmodur IL.

Polyisocyanate (5): Aromatic polyisocyanate based on TDI according to Formula (5); 50% solution in isobutyl acetate; e.g. Polyurene KC.

Polyisocyanate (6): Aromatic polyisocyanate based on TDI/diphenylmethane-4,4-diisocyanate according to Formula (6); 50% solution in isobutyl acetate; e.g. Polyurene HR.

| Example No. | (Step a) Components | Parts | %/NCO | (Step b) Components | Parts | %/NCO | (Step c) Components | Parts | Solids % |
|---|---|---|---|---|---|---|---|---|---|
| 1 | Polyisocyanate (2) | 8.8 | 35 | Polyethylene glycol ($\overline{M}_n$ = 1000) | 3.0 | 66 | 3-Aminopropanol | 1.5 | 30 |
|   | Polyester A | 18.9 |   | Xylene | 41.3 |   | Xylene | 3.2 |   |
|   | Xylene | 23.3 |   |   |   |   |   |   |   |
| 2 | Polyisocyanate (1) | 8.4 | 40 | Polyethylene glycol ($\overline{M}_n$ = 1000) | 0.8 | 48 | p-Aminobenzoic Acid | 2.1 | 25 |
|   | Polyester A | 15.8 |   | Xylene | 31.8 |   | NMP[1] | 21.0 |   |
|   | Xylene | 20.1 |   |   |   |   |   |   |   |
| 3 | Polyisocyanate (3) | 12.9 | 40 | Polyethylene glycol ($\overline{M}_n$ = 600) | 0.9 | 50 | Mercaptosuccinic Acid | 2.5 | 30 |
|   | Polyester A | 18.8 |   | Xylene | 37.8 |   | Xylene | 5.7 |   |
|   | Xylene | 21.4 |   |   |   |   |   |   |   |
| 4 | Polyisocyanate (4) | 15.2 | 45 | Polyethylene glycol ($\overline{M}_n$ = 200) | 0.5 | 57 | Aminoethoxyethanol | 1.5 | 30 |

-continued

| Example No. | (Step a) Components | Parts | %/NCO | (Step b) Components | Parts | %/NCO | (Step c) Components | Parts | Solids % |
|---|---|---|---|---|---|---|---|---|---|
|  | Polyester A | 20.2 |  | Xylene | 38.8 |  | Xylene | 3.2 |  |
|  | Xylene | 20.6 |  |  |  |  |  |  |  |
| 5 | Polyisocyanate (5) | 14.4 | 40 | Polyethylene glycol ($\overline{M}_n = 1000$) | 1.3 | 51 | Diisopropanol amine | 1.9 | 23 |
|  | Polyester G | 12.4 |  | Xylene | 38.9 |  | Xylene | 4.3 |  |
|  | Xylene | 26.8 |  |  |  |  |  |  |  |
| 6 | Polyisocyanate (2) | 9.3 | 35 | Polyethylene glycol ($\overline{M}_n = 800$) | 2.4 | 55 | 3-Aminopropanol | 1.3 | 30 |
|  | Polyester A | 19.3 |  | Xylene | 40.6 |  | Xylene | 3.1 |  |
|  | Xylene | 24.0 |  |  |  |  |  |  |  |
| 7 | Polyisocyanate (2) | 9.7 | 35 | Polypropylene glycol ($\overline{M}_n = 1000$) | 1.2 | 45 | p-Aminobenzoic Acid | 3.1 | 25 |
|  | Polyester B | 13.4 |  | Xylene | 30.5 |  | NMP | 23.9 |  |
|  | Xylene | 18.2 |  |  |  |  |  |  |  |
| 8 | Polyisocyanate (2) | 10.3 | 40 | Polytetrahydro-furandiol ($\overline{M}_n = 1000$) | 3.0 | 60 | Sulfanilic Acid | 3.2 | 30 |
|  | Polyester C | 16.2 |  | Xylene | 39.0 |  | NMP/DMF[2] 1:2 | 6.9 |  |
|  | Xylene | 21.4 |  |  |  |  |  |  |  |
| 9 | Polyisocyanate (6) | 11.4 | 50 | Polyethylene glycol ($\overline{M}_n = 800$) | 0.9 | 62 | Mercaptobenzoic Acid | 1.3 | 24 |
|  | Polyester A | 16.1 |  | Xylene | 38.9 |  | Xylene | 3.8 |  |
|  | Xylene | 27.5 |  |  |  |  |  |  |  |
| 10 | Polyisocyanate (1) | 11.9 | 25 | Polyethylene glycol ($\overline{M}_n = 1000$) | 2.0 | 42 | Diisopropanol-amine | 3.0 | 27 |
|  | Polyester F | 13.0 |  | Xylene | 33.8 |  | Xylene/NMP (2:3) | 17.4 |  |
|  | Xylene | 18.9 |  |  |  |  |  |  |  |
| 11 | Polyisocyanate (1) | 7.2 | 25 | Polytetrahydro-furandiol ($\overline{M}_n = 1000$) | 2.9 | 68 | 3-Aminopropanol | 0.8 | 20 |
|  | Polyester D | 10.9 |  | Xylene | 28.5 |  | NMP | 35.2 |  |
|  | Xylene | 14.5 |  |  |  |  |  |  |  |
| 12 | Polyisocyanate (1) | 13.9 | 25 | Polyethylene glycol ($\overline{M}_n = 1000$) | 2.3 | 42 | Isopropanolamine | 2.0 | 30 |
|  | Polyester F | 15.2 |  | Xylene | 39.7 |  | Xylene | 4.7 |  |
|  | Xylene | 22.2 |  |  |  |  |  |  |  |
| 13 | Polyisocyanate (2) | 16.0 | 20 | 1,4-Diaminobutane | 0.5 | 40 | Mercaptosuccinic Acid | 5.7 | 30 |
|  | Polyglycolmonobutyl ether[3] ($\overline{M}_n = 1000$) | 11.8 |  | Xylene | 32.8 |  | Xylene | 13.4 |  |
|  | Xylene | 19.8 |  |  |  |  |  |  |  |
| 14 | Polyisocyanate (2) | 8.9 | 37 | Dihydroxypolybuta-diene $\overline{M}_n = 1000$ | 2.2 | 54 | Mercaptobenzoic Acid | 2.7 | 30 |
|  | Polyester E | 18.4 |  | Xylene | 38.6 |  | Xylene | 6.4 |  |
|  | Xylene | 22.8 |  |  |  |  |  |  |  |
| 15 | Polyisocyanate (2) | 10.0 | 25 | Polypropylene glycol ($\overline{M}_n = 1000$) | 4.4 | 66 | Mercaptobenzoic Acid | 3.2 | 30 |
|  | Polyester E | 14.9 |  |  |  |  | Xylene | 7.5 |  |
|  | Xylene | 19.8 |  | Xylene/NMP 1:1 | 40.2 |  |  |  |  |
| 16 | Polyisocyanate (1) | 13.2 | 30 | Polyester L | 3.3 | 52 | p-Aminobenzoic Acid | 3.1 | 25 |
|  | Methoxypolyethylene glycol ($\overline{M}_n = 750$) | 8.7 |  | Xylene | 32.6 |  | NMP | 23.8 |  |
|  | Xylene | 15.3 |  |  |  |  |  |  |  |
| 17 | Polyisocyanate (4) | 22.8 | 40 | Trimethylolpropane | 0.5 | 67 | 3-Aminopropanol | 1.6 | 30 |
|  | Polyester H | 16.3 |  | Xylene | 30.6 |  | Xylene | 3.6 |  |
|  | Xylene/NMP 1:2.5 | 24.6 |  |  |  |  |  |  |  |
| 18 | Polyisocyanate (2) | 15.2 | 20 | 1,4-Diaminobutane | 0.5 | 37 | 3-Aminopropyltri-methoxysilane | 6.9 | 30 |
|  | Polyglycol monobutyl ether[3] ($\overline{M}_n = 1000$) | 11.2 |  | Xylene | 31.3 |  | Xylene | 16.0 |  |
|  | Xylene | 18.9 |  |  |  |  |  |  |  |
| 19 | Polyisocyanate (3) | 14.9 | 40 | Polyethylene glycol ($\overline{M}_n = 600$) | 1.3 | 64 | p-Aminobenzoic Acid | 2.3 | 25 |
|  | Polyester K | 12.5 |  | Xylene | 13.1 |  | NMP | 22.1 |  |
|  | Xylene/NMP 1:1 | 33.8 |  |  |  |  |  |  |  |
| 20 | Polyisocyanate (1) | 12.5 | 30 | Polyethylene glycol ($\overline{M}_n = 1000$) | 3.9 | 60 | 3-Aminopropanol | 1.4 | 23 |
|  | Methoxypolyethylene glycol ($\overline{M}_n = 750$) | 8.3 |  | Xylene/NMP 7:3 | 43.8 |  | NMP | 15.6 |  |
|  | Xylene | 14.5 |  |  |  |  |  |  |  |
| 21 | Polyisocyanate (6) | 17.1 | 60 | Ethoxylated Stearylamine ($\overline{M}_n = 750$) | 1.1 | 68 | Tris(hydroxymethyl)-aminomethane | 1.3 | 21 |
|  | Polester K | 10.5 |  |  |  |  |  |  |  |
|  | Xylene/NMP 3:2 | 46.1 |  | Xylene | 20.8 |  | DMF | 3.1 |  |

[1] NMP = N—Methylpyrrolidone
[2] DMF = Dimethylformamide
[3] Ethylene oxide-propylene oxide-copolymer (EO:PO = 1:1)

EXAMPLE 22

Under a protective gas 97.7 parts of the product obtained according to Example 1 were reacted with 2.3 parts maleic acid anhydride. The mixture was heated to 100° C. and stirred at this temperature until no more anhydride groups were analytically detectable (about 5 hours). The end product is a pale yellow liquid with a solids content of 32%.

EXAMPLE 23

Following the process set forth in Example 22, 96.8 parts of the product obtained according to Example 6 were reacted with 3.2 parts maleic acid anhydride. A pale yellow liquid with a solids content of 32% was obtained.

EXAMPLE 24

Following the process set forth in Example 22, 96.6 parts of the product obtained according to Example 5 were reacted with 3.4 parts phthalic acid anhydride. A pale yellow liquid with a solids content of 32% was obtained.

EXAMPLE 25

Following the process set forth in Example 22, 97.6 parts of the product obtained according to Example 5 were reacted with 2.4 parts maleic acid anhydride. The resulting yellowish liquid had a solids content of 32%.

EXAMPLE 26

Under a protective gas, 11.9 parts polyisocyanate (4) were combined with 0.6 parts octanol dissolved in 9.6 parts ethyl acetate and 0.003 parts dibutyltin dilaurate with stirring and heated to 60° C. As soon as 19% of the initial NCO— groups had reacted, 0.007 parts ethylene glycol 10% solution dissolved in NMP were added, and the temperature of the mixture was increased to 70° C. After reaction of 20% of the originally supplied NCO-groups, 3.4 parts citric acid dissolved in 74.6 parts NMP were added. Stirring was continued for one hour at 70° C. The resulting product solution is slightly viscous, clear and light yellow and has a solids content of 10%.

EXAMPLE 27

Under a protective gas, a solution of 39.3 parts 2-ethylhexyl acrylate, 2.9 parts 2-mercaptoethanol, 1.1 parts azobis-(isobutyrontrile) and 20 parts ethyl acetate were added dropwise to 36.7 parts boiling ethyl acetate in such a way that the temperature of the reaction mixture does not exceed 85° C. After completion of the addition, stirring was continued for two more hours under reflux. After repeated washing with dilute NaCl solution, the reaction mixture was combined with 200 ml toluene and dried through a molecular sieve. After filtering off, distillation was carried out for so long until the residue exhibited a solids content of 92%

16.8 parts of the resulting polyacrylate according to formula I are combined with 9.3 parts polyisocyanate (2), 18.8 parts PMA (propylene glycol monomethyl-ether acetate) and 0.01 parts DBTL (dibutyltin dilaurate) and stirred under a protective gas at 80° C. After 40% of the originally supplied NCO— groups had reacted, 3.5 parts polyethylene glycol ($M_n$=1,000) and 38.3 parts PMA were added. After a further 20% of the originally utilized NCO— groups had reacted, the mixture was combined with 2 g p-aminobenzoic acid in 11.3 g PMA/NMP (4:6) and stirred one more hour at 80° C. The moderately viscous end product had a solids content of 28%.

EXAMPLE 28

Under a protective gas, 44.8 parts n-butyl acetate, 25.9 parts IPDI (isophorone diisocyanate), 27 parts 1,6-hexanediol, 2.2 parts n-butanol and 0.001 parts DBTL were stirred for so long at 70° C. until all NCO— groups had reacted. To 23.2 parts of the resulting solution of polyurethane according to formula I, 6.3 parts polyisocyanate (2), 3.2 parts PMA and 0.01 parts DBTL were added and heated to 80° C. After 40% of the initially supplied NCO— groups had reacted, 2.4 parts polyethylene glycol ($M_n$=1,000) and 27.4 parts PMA were added at 80° C. After an additional 20% of the initially supplied NCO— groups had reacted, 1.2 parts p-aminobenzoic acid in 36.2 parts NMP were added and stirred 1 more hour at 80° C. The resulting colorless end product had a solids content of 20%.

EXAMPLE 29

(a) Under a protective gas, 28.3 parts IPDI, 41.4 parts 1,12-dodecanediol, 29.9 parts xylene and 0.005 parts DBTL were stirred for so long at 70° C. until all of the NCO— groups had reacted.

(b) 11.0 parts polyisocyanate (2), 33.3 parts polyester H, 16.3 parts NMP and 0.01 parts DBTL were stirred under a protective gas at 80° C. After 40% of the NCO— groups were reacted, 5 parts of the polyurethane diol according to formula II obtained under (a) and 3.7 parts xylene were added. After a further 20% of the originally supplied NCO— groups had reacted, 2.3 parts p-aminobenzoic acid and 28.4 parts xylene were added and the mixture was stirred 1 more hour at 80° C. The moderately viscous end product had a solids content of 30%.

EXAMPLE OF USE

Ground Material

To produce the ground or milled material, 22 parts by weight of two 14% alkyd resins were weighed into a tempered (40° C.) refined steel stirring vessel with 6 parts by weight of a solvent mixture (aromatic fraction b.p.=162°–177° C.:butyl acetate:xylene=4:0.8:1.2) and mixed. Thereafter the addition of X parts by weight of the addition compound according to the invention, or of the comparison compound, took place. After homogenization was completed, Y parts by weight of pigment were added (Table 1). The parts by weight of the addition compound according to the invention or of the comparison compound are calculated as 100% solids.

Homogenization was carried out, 150 weight percent glass beads, calculated with respect to the charge of milled material, were added, and dispersing was carried out for 30 minutes at 40° C. with a commercially available dispersing apparatus by stirring with a polypropylene disk fitted to the size of the vessel at a peripheral speed of about 8 m.s$^{-1}$.

Overall Formulation

To the milled material was added a lacquering material composed of 23.4 parts by weight of the two alkyd resins, solids content=15%, 14 parts by weight hexa(methoxymethyl)melamine resin, solids content=9.8% and 14.6 parts by weight of a solvent mixture (aromatic fraction b.p.=187°–207° C.:aromatic fraction b.p.=162°–177° C.:xylene:butanol=35:20:35:10). To effect homogenization the charge was stirred for 2 minutes at approximately 2 m.s$^{-1}$. Thereafter the glass beads were removed by filtration. Before further processing, the lacquer was allowed to stand for 12 to 15 hours at room temperature. A first portion of the thusly produced lacquer was then further processed as described hereinafter, and a second portion of the thusly produced lacquer was further processed in the same manner described hereinafter after 14 days storage at 50° C. The results obtained with the lacquer which was processed immediately are compiled in Table 2, while the results obtained with the lacquer which was processed after 14 days storage are compiled in Table 3.

The lacquer was adjusted to 20″ DIN 4/23° C. with the solvent mixture which is also contained in the lacquering material. After one hour storage at room temperature, the adjusted lacquer is poured out onto a cleaned glass plate inclined at an angle of 80°. After firing at 140° C. (30 minutes) the lacquer film is evaluated for gloss and transparency as well as under a light microscope for particle size or flocculation.

The evaluation takes place according to a numerical scale from 0 to 10, wherein 0=no flocculation, high gloss, good transparency and 10=total flocculation, no gloss, no transparency. The results obtained are given in the line "Colored Paint" in Tables 2 and 3.

A further method for determining the pigment size distribution and the pigment stabilization in the lacquer is mixing with a white lacquer and a following rubout-test (white mixing): for this purpose the poured out lacquer is allowed to air dry (about 10 minutes) and the sample is rubbed with the finger until constant color is achieved.

To do this the source (base) lacquers of the colored pigments I through VIII according to Table 1 are mixed in a ratio of 1:4 with a white lacquer (Y=25 parts by weight titanium dioxide and X=0.75 parts by weight of the corresponding addition compound according to the invention as in the colored lacquer or the comparative example; binder as in the colored lacquer to be mixed), homogenized and adjusted to 16″ DIN 4/23. The material is poured on a glass plate inclined at 80° and after airing (about 10 minutes) the rubout-test is carried out.

After hardening of the film, the color intensity is evaluated for both the rubbed out sample and the sample which has not been rubbed out. For this purpose a scale from 0 to 10 was again used, wherein 0=the same color intensity, the same color tone, no swimming (or washing) out, i.e. no discernible difference between the rubbed out sample and the sample which has not been rubbed out, and 10=fully different color intensity, and swimming out of a pigment. The results obtained are given in the line "White Mixing" in Tables 2 and 3.

Example 16 of European patent application EP-A No. 0,154,678 was used as a comparison compound which differs substantially from the addition compounds of the invention with comparable molecular structure by its basic character.

TABLE 1

| Pigment Utilized | Test | Y Parts | Addition compound of the invention or Comparative Example* | X Parts |
|---|---|---|---|---|
| Iron oxide red | | | | |
| C.I.1 PR 101 | I A | 10 | Example 13 | 0.5 |
| C.I.2 77491 (Bayferrox 130 ®) | I V | 10 | Comparative Example | 0.5 |
| Iron oxide yellow | | | | |
| C.I.1 PY 42 | II A | 10 | Example 17 | 0.2 |
| C.I.2 77492 (Bayferrox 3920 ®) | II V | 10 | Comparative Example | 0.2 |
| Chrome titanate yellow | | | | |
| C.I.1 PBr 24 | III A | 20 | Example 18 | 1.0 |
| C.I.2 77310 (Sicotan yellow L 1910 ®) | III V | 20 | Comparative Example | 1.0 |
| Nickel titanate yellow | | | | |
| C.I.1 PY53 | IV A | 20 | Example 14 | 1.0 |
| C.I.2 77778 (Light yellow 8G ®) | IV V | 20 | Comparative Example | 1.0 |
| Gas carbon black | | | | |
| Regular Color Channel (Printex U ®) | V A | 3 | Example 7 | 0.6 |
| | V V | 3 | Comparative Example | 0.6 |
| Perylen red | | | | |
| C.I.1 PR 224 | VI A | 5 | Example 9 | 0.75 |
| C.I.2 71127 (Perrindo Red R 6418 ®) | VI V | 5 | Comparative Example | 0.75 |
| Chinophthalon yellow | VII A | 5 | Example 9 | 0.75 |
| C.I.1 PY 138 (Paliotol yellow L 0962 HD ®) | VII V | 5 | Comparative Example | 0.75 |
| Dioxazine Violet | | | | |
| C.I.1 PV 23 | VIII A | 5 | Example 9 | 0.75 |
| C.I.2 51319 (Hostaperm Violet RL spez. ®) | VIII V | 5 | Comparative Example | 0.75 |

*Comparative Example: Example 16 from European Patent Application EP-A 0,154,678

TABLE 2

| | I | | II | | III | | IV | | V | | VI | | VII | | VIII | |
|---|---|---|---|---|---|---|---|---|---|---|---|---|---|---|---|---|
| Pigment | A | V | A | V | A | V | A | V | A | V | A | V | A | V | A | V |
| Colored Paint | 0 | 6 | 0 | 8 | 0 | 6 | 0 | 10 | 1 | 5 | 1 | 6 | 0 | 4 | 2 | 7 |

TABLE 2-continued

| Pigment | I A | I V | II A | II V | III A | III V | IV A | IV V | V A | V V | VI A | VI V | VII A | VII V | VIII A | VIII V |
|---|---|---|---|---|---|---|---|---|---|---|---|---|---|---|---|---|
| White Separation | 0 | 7 | 0 | 8 | 0 | 6 | 1 | 9 | 0 | 7 | 1 | 7 | 0 | 5 | 2 | 7 |

A = Addition compound according to the invention
V = Comparative Example

TABLE 3

(14 days storage at 50° C.)

| Pigment | I A | I V | II A | II V | III A | III V | IV A | IV V | V A | V V | VI A | VI V | VII A | VII V | VIII A | VIII V |
|---|---|---|---|---|---|---|---|---|---|---|---|---|---|---|---|---|
| Colored Paint | 0 | 8 | 0 | 9 | 0 | 7 | 0 | 10 | 1 | 6 | 1 | 7 | 0 | 6 | 2 | 9 |
| White Separation | 0 | 8 | 0 | 9 | 0 | 8 | 0 | 9 | 0 | 7 | 1 | 7 | 1 | 8 | 3 | 10 |

A = Addition compound according to the invention
V = Comparative Example

The paints obtained with the addition compounds according to the invention achieve a significantly better stabilization of the pigments.

EXAMPLE OF USE IX 100 parts of an aqueous isobutanol pigment suspension (isobutanol content 50%, pigment content 10%) of C.I.1 Pigment Red 224 (71127) are combined slowly with 6 parts of the additive solution obtained according to Example 20 at 50° C. with stirring. Thereafter stirring was continued for 5 hours at 50° C. Subsequently, the solvent was distilled off with steam, the pigment was filtered, washed with water, dried and ground.

The full tone paints produced with the thusly treated pigment are distinguished by very good rheological characteristics and outstanding gloss.

If, for comparison, the described treatment of C.I. Pigment Red 224 in the isobutanol-water mixture is repeated without incorporation of the addition compound, then a pigment is obtained whose full tone paints exhibit a clearly inferior gloss.

EXAMPLE OF USE X

By proceeding as in Example IX but using, instead of the pigment mentioned there, 9 parts of C.I.1 Pigment Brown 24 with 4 parts of the addition compound according to Example 20, a pigment is likewise obtained which yields a full tone paint with clearly improved gloss compared to the corresponding comparison pigment.

EXAMPLE OF USE XI

A pigment paste was produced with the addition compound obtained according to Example 26. In order to do this 60 g C.I.1 Pigment Yellow, 42.6 g product solution, 54.6 g NMP and 120 g glass beads were combined and subsequently dispersed for 30 minutes at 40° C. using a polypropylene disk having a diameter of 40 mm. After fitering off the glass beads, a flowable pigment paste with outstanding rheological characteristics was obtained. By adding 5% of this pigment paste to an alkyd-melamine-white lacquer (22% $TiO_2$, 46.6% fatty acid modified medium oily alkyd resin, 24.3% melamine resin) a high gloss lacquer film with a defect free surface was obtained.

In contrast, an otherwise corresponding paste produced with the comparison compound (Example 16 of European patent application EP-A No. 0,154,678) was not flowable and showed a definite thixotropy, and the lacquer film obtained therewith was clearly more matt and full of pigment specks.

The foregoing description and examples have been set forth merely to illustrate the invention and are not intended to be limiting. Since modifications of the described embodiments incorporating the spirit and substance of the invention may occur to persons skilled in the art, the scope of the invention should be construed with respect to the appended claims and equivalents.

We claim:

1. An addition compound or salt thereof suitable for use as a dispersing aid or dispersion stabilizer obtained by reacting a polyisocyanate having an average functionality of from 2.5 to 10
(a) with at least one monohydroxycompound of Formula I $$Y-OH \qquad \qquad \text{I}$$

wherein Y represents:
(i) an aliphatic or cycloaliphatic hydrocarbon group with 8 to 30 carbon atoms, the hydrogen atoms of which may be partially replaced by halogens or aryl residues, or
(ii) an aliphatic, cycloaliphatic or aromatic group containing at least one —O—, —NHCOO— or —COO— group, having an average molecular weight $M_n$ from 200 to 10,000, the hydrogen atoms of which may be partially replaced by halogens,
in such an amount that 10 to 70% of the NCO—groups are reacted;
(b) reacting the product of stage (a) with at least one compound of Formula II $$G-(E)_n \qquad \qquad \text{II}$$

wherein
E represents —OH, —$NH_2$, or —NHR (in which R represents an alkyl group having 1 to 4 carbon atoms),
n represents 2 or 3, and
G represents an aliphatic, cycloaliphatic or aromatic group containing at least 2 carbon atoms having an average molecular weight $M_n$ of at most 3000, which may contain —O—, —COO—, —CONH—, —NHCOO—, —S—, —Si($CH_3$)$_2$O— or —$SO_2$— group, in such an amount that a further 1 to 50% of the NCO— groups of the originally provided polyisocyanate are reacted, whereby in stages (a) and (b) all total from 20 to 85% of the NCO— groups of the originally provided polyisocyanate are reacted, and (c) reacting the product of stage (b) with at least one compound of Formula III $$Z-Q \qquad \text{III}$$

of IV $$Z-NH-Z \qquad \text{IV}$$

wherein

Q represents —OH, —NH$_2$, —NHR (wherein R represents an alkyl group having 1 to 4 carbons atoms) or —SH, and Z may be the same or different and represents an aliphatic, cycloaliphatic or aromatic residue having at least one acidic functional group, OH— group or —Si(OR)$_m$(R')$_{3-m}$— group (wherein R and R' represent alkyl groups with 1 to 10 carbon atoms and m=1–3), in such an amount that at least 0.8 molecule of the compound Z—Q or Z—NH—Z is provided for each remaining isocyanate group not reacted in stages (a) and (b).

2. An addition compound or salt thereof according to claim 1, wherein the product of stage (c) contains hydroxyl group; said compound being obtained by reacting the hydroxyl group containing product of stage (c) in a further stage (d) with polycarboxylic acids having at least 2 carboxyl groups or their anhydrides while substantially avoiding cross-linking reactions.

3. An addition compound or salt thereof according to claim 1, obtained by reacting said polyisocyanate in the presence of a solvent.

4. An addition compound or salt thereof according to claim 1, obtained by reacting said polyisocyanate in the presence of a polyisocyanate reaction catalyst.

5. An addition compound or salt thereof according to claim 1, obtained by a reaction in which from 15 to 45% of the NCO— groups of the originally provided polyisocyanate are reacted in stage (a); from 5 to 45% of the NCO— groups of the originally provided polyisocyanate are reacted in stage (b), and in stages (a) and (b) together from 30 to 65% of the NCO— groups of the originally provided polyisocyanate are reacted.

6. An addition compound or salt thereof according to claim 5, obtained by a reaction in which from 20 to 40% of the NCO— groups of the originally provided polyisocyanate are reacted in stage (a); from 15 to 40% of the NCO— groups of the originally provided polyisocyanate are reacted in stage (b), and in stages (a) and (b) together from 40 to 60% of the NCO— groups of the originally provided polyisocyanate are reacted.

7. An addition compound or salt thereof according to claim 1, wherein Z contains an OH— group which is present as an acetal.

8. An addition compound or salt thereof according to claim 1, wherein in the compound of Formula I, Y represents aliphatic, cycloaliphatic or aromatic group containing at least one —O— or —COO— group having an average molecular weight $M_n$ of 200 to 10,000, and wherein the hydrogen atoms may be partially replaced by halogens.

9. An addition compound or salt thereof according to claim 1, wherein in the compound of Formula II, G represents an aliphatic, cycloaliphatic or aromatic group containing at least 2 carbon atoms having an average molecular weight $M_n$ of at most 3000, which may contain —O—, —COO—, —CONH—, —S—, —Si(CH$_3$)$_2$O— or —SO$_2$— groups.

10. An addition compound or salt thereof according to claim 1, wherein the monohydroxy compound of Formula I is a polyester having an average molecular weight $M_n$ from 500 to 5000.

11. An addition compound or salt thereof according to claim 10, wherein said polyester is formed from an aliphatic lactone and an aliphatic monoalcohol having 4 to 18 carbon atoms.

12. An addition compound or salt thereof according to claim 1, wherein the monohydroxy compound of Formula I is a polyoxyalkyleneglycolmonoalkylether having an average molecular weight $M_n$ from 200 to 3000.

13. An addition compound or salt thereof according to claim 1, wherein the compound of Formula II is a polyoxyalkyleneglycol.

14. An addition compound or salt thereof according to claim 13, wherein said polyoxyalkyleneglycol has an average molecular weight $M_n$ from 400 to 2000.

15. An addition compound or salt thereof according to claim 1, wherein the compound of Formula II is a hydroxypolyester having 2 to 3 OH— groups and an average molecular weight $M_n$ from 500 to 3000.

16. An addition compound or salt thereof according to claim 1, wherein in the compound of Formula III, Q represents —NH$_2$ or —SH.

17. An addition compound or salt thereof according to claim 1, wherein in Formulas III and IV, the group Z carries at least one —CO$_2$H or —SO$_3$H group.

18. An addition compound or salt thereof according to claim 1, wherein in Formula III, Z—Q is a primary amine with at least one —OH group.

19. An addition compound or salt thereof according to claim 1, wherein in Formula IV, Z—NH—Z is a secondary amine with at least one —OH group.

20. A process for producing addition compounds and salts thereof suitable for use as dispersing agents and as dispersion stabilizers, comprising reacting at least one polyisocyanate having an average functionality from 2.5 to 10

(a) with at least one monohydroxy compound of Formula I $$Y-OH \qquad \text{I}$$

wherein Y represents (i) an aliphatic or cycloaliphatic hydrocarbon group with 8 to 30 carbon atoms, the hydrogen atoms of which may be partially replaced by halogens or aryl residues, or (ii) an aliphatic, cycloaliphatic or aromatic group containing at least one —O—, —NHCOO— or —COO— group, having an average molecular weight $M_n$ from 200 to 10,000, the hydrogen atoms of which may be partially replaced by halogens, in such an amount that 10 to 70% of the NCO— groups are reacted;

(b) reacting the product of stage (a) with at least one compound of Formula II $$G-(E)_n \qquad \text{II}$$

wherein

E represents —OH, —NH$_2$, or —NHR (in which R represents an alkyl group having 1 to 4 carbon atoms), n represents 2 to 3, and G represents an aliphatic, cycloaliphatic or aromatic group containing at least 2 carbon atoms having an average molecular weight M$_n$ of at most 3000, which may contain —O—, —COO—, —CONH—, —NHCOO—, —S—, —Si(CH$_3$)$_2$O— or —SO$_2$— groups, in such an amount that a further 1 to 50% of the NCO— groups of the originally provided polyisocyanate are reacted, whereby in stages (a) and (b) all total from 20 to 85% of the NCO groups of the originally provided polyisocyanate are reacted, (c) reacting the product of stage (b) with at least one of the compound of Formula III

Z—Q    III or IV

Z—NH—Z    IV wherein

Q represents —OH, —NH$_2$, —NHR (wherein R represents an alkyl group having 1 to 4 carbons atoms) or —SH, and Z may be the same or different and represents an aliphatic, cycloaliphatic or aromatic residue having at least one acidic functional group, OH— group or Si(OR)$_m$(R')$_{3-m}$— group (wherein R and R' represent alkyl groups with 1 to 10 carbon atoms and m=1-3), in such an amount that at least 0.8 molecule of the compound Z—Q or Z—NH—Z is provided for each remaining isocyanate group not reacted in stages (a) and (b).

21. A process according to claim 20, wherein the product of stage (c) contains hydroxyl groups; further comprising reacting the hydroxyl group containing product of stage (c) in a further stage (d) with polycarboxylic acids having at least 2 carboxyl groups or their anhydrides while substantially avoiding cross-linking reactions.

22. A process according to claim 20, wherein said polyisocyanate is reacted in the presence of a solvent.

23. A process according to claim 20, wherein said polyisocyanate is reacted in the presence of a polyisocyanate reaction catalyst.

24. A process according to claim 20, wherein from 15 to 45% of the NCO-groups of the originally provided polyisocyanate are reacted in stage (a); from 5 to 45% of the NCO— groups of the originally provided polyisocyanate are reacted in stage (b), and in stages (a) and (b) together from 30 to 65% of the NCO— groups of the originally provided polyisocyanate are reacted.

25. A process according to claim 24, wherein from 20 to 40% of the NCO— groups of the originally provided polyisocyanate are reacted in stage (a); from 15 to 40% of the NCO— groups of the originally provided polyisocyanate are reacted in stage (b), and in stages (a) and (b) together from 40 to 60% of the NCO— groups of the originally provided polyisocyanate are reacted.

26. A process according to claim 20, wherein Z contains an OH— group which is present as an acetal.

27. A process according to claim 20, wherein in the compound of Formula I, Y represents an aliphatic, cycloaliphatic or aromatic group containing at least one —O— or —COO— group, having an average molecular weight M$_n$ of 200 to 10,000, and wherein the hydrogen atoms may be partially replaced by halogens.

28. A process according to claim 20, wherein in the compound of Formula II, G represents an aliphatic, cycloaliphatic or aromatic group containing at least 2 carbon atoms having an average molecular weight M$_n$ of at most 3000, which may contain —O—, —COO—, —CNH—, —S—,—Si(CH$_3$)$_2$O— or —SO$_2$— groups.

29. A process according to claim 20, wherein the monohydroxy compound of Formula I is a polyester having an average molecular weight M$_n$ from 500 to 5000.

30. A process according to claim 29, wherein said polyester is formed from an aliphatic lactone and an aliphatic monoalcohol having 4 to 18 carbon atoms.

31. A process according to claim 20, wherein the monohydroxy compound of Formula I is a polyoxyalkyleneglycolmonoalkylether having an average molecular weight M$_n$ from 200 to 3000.

32. A process according to claim 20, wherein the compound of Formula II is a polyoxyalkyleneglycol.

33. A process according to claim 32, wherein said polyoxyalkyleneglycol has an average molecular weight M$_n$ from 400 to 2000.

34. A process according to claim 20, wherein the compound of Formula II is a hydroxypolyester having 2 to 3 OH— groups and an average molecular weight M$_n$ from 500 to 3000.

35. A process according to claim 20, wherein in the compound of Formula III, Q represents —NH$_2$ or —SH.

36. A process according to claim 20, wherein in Formulas III and IV, the group Z carries at least one —CO$_2$H or —SO$_3$H group.

37. A process according to claim 20, wherein in Formula III, Z—Q is a primary amine with at least one —OH group.

38. A process according to claim 20, wherein in Formula IV, Z—NH—Z is a secondary amine with at least one —OH group.

39. A process for dispersing a particulate solid in a liquid comprising applying an addition compound according to claim 1 to said solid and thereafter dispersing said solid in said liquid.

40. A process for stabilizing a dispersion of a particulate solid in a liquid comprising incorporating an addition compound according to claim 1 in said dispersion.

41. A particulate solid coated with an addition compound or salt thereof according to claim 1.

42. A pigment particle coated with an addition compound or salt thereof according to claim 1.

43. A reinforcing fiber for a synthetic polymer coated with an addition compound or salt thereof according to claim 1.

* * * * *